# 2,924,571

METHOD OF INHIBITING CORROSION OF METALS

William B. Hughes, Tulsa, Okla., assignor to Cities Service Research and Development Company, New York, N.Y., a corporation of New Jersey No Drawing. Application November 16, 1955
Serial No. 547,342

5 Claims. (Cl. 252—8.55)

This invention relates to inhibiting corrosion of metals, and is more particularly directed to improved compositions and processes for minimizing the corrosive effect of oil brine mixtures on oil field production and transmission equipment.

It is generally recognized that oil-producing formations often yield with the crude oil a brine which is extremely corrosive in its action upon the oil-producing and collecting equipment, including the metal tubing, casings, pumps, pipe lines, and storage equipment. This type of corrosion is particularly noticeable in wells producing brine which contain varying amounts of hydrogen sulfide, carbon dioxide, and other acidic materials.

Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide improved corrosion inhibiting compounds having structures which make them uniquely effective in minimizing and reducing corrosion in wells producing oil-brine mixtures, and particularly reducing corrosion in wells in which large amounts of brine are produced as compared to oil.

I have discovered that certain bis-oxazoline structures, obtained by reacting an ethanolamine with a dicarboxylic acid, are very effective in inhibiting the corrosive action of oil well brines. The bis-oxazoline compounds found to be so effective in corrosion reduction are prepared by reacting two mols of monoethanolamine, with one mol of a dicarboxylic acid. This reaction and the generic compounds obtainable therefrom may generally be represented as follows:

2HO—CH₂—CH₂—NH₂+HOOC—R—COOH ⟶

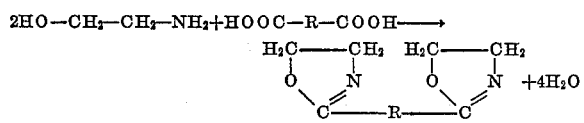

In the bis-oxazoline structure above, R represents the carbon chain of the acid residue remaining after the removal of four mols of water. I have found that dicarboxylic acids having two or more carbon atoms in the chain, either saturated or unsaturated, provide bis-oxazoline compounds most effective in corrosion inhibiting. While the low molecular weight dicarboxylic acids such as oxalic or malonic may also be used in the preparation of the bis-oxazoline compounds, these reaction products do not provide, when used in the normal quantities of 25 to 100 p.p.m., sufficiently effective protection to warrant their use from an economical point of view. At concentrations above 100 p.p.m., bis-oxazoline structures prepared by reacting an ethanolamine with oxalic or malonic acid will provide some inhibiting effect, but not in an amount sufficient to warrant their use for this purpose.

Among the acids which I have found provide particularly effective bis-oxazoline structures are dimerized linoleic acid, often referred to as dimer acid, oleic, succinic, sebacic, and terephthalic. In addition to the saturated and unsaturated dicarboxylic acids heretofore mentioned, I have found that dicarboxylic acids which include other constituents such as hydroxyl groups on the linking carbon chain may also be used. A typical example of this type of acid is mucic acid.

In carrying out the preparation, the acid and amine compounds are mixed and heated to a temperature of about 90° C. in the presence of a small amount of benzene. The benzene is added to form a water-benzene azeotropic mixture so that water produced from the conversion of carboxyl oxygen in the reaction of acid and amine may be removed from the reaction mixture. The benzene is continuously recovered and returned to the reaction vessel to remove further amounts of water. When substantially the theoretical amount of water has been removed, i.e. that amount which would be produced on conversion of all the acid carboxyl oxygen, which, in the case of a dicarboxylic acid according to this reaction is four mols, heating is stopped and any remaining benzene is distilled from the reaction product. The reaction product is then washed with water to remove any excess amine and is returned to the reactor and dried by benzene distillation.

In order to more clearly understand the method by which the bis-oxazoline structures of my invention may be prepared, the following examples are given, it being understood that the exact conditions given in the examples are not in any way critical:

Example 1

To 300 grams (0.5 mol) of dimerized linoleic acid prepared according to directions given in "Journal of American Oil Chemists Society," 24, 65 (March 1947), and hereafter referred to as dimer acid, 61 grams (1.0 mol) of monoethanolamine and 50 ml. of benzene were added. The mixture was heated to a temperature of about 90° C. under a water trap condenser to distill the water-benzene azeotropic mixture resulting from the conversion of the acid carboxyl oxygens to water. Condensed benzene was continuously returned through the decanter stillhead to the reaction vessel. At the end of a four hour heating period, 35.8 grams of water had been removed from the reaction, representing substantially the theoretical quantity which could be expected from the conversion of both carbonyl groups to water in forming the bis-oxazoline. Benzene remaining after the heating period was removed by distillation. The reaction product was washed with water to remove excess amine, returned to the reactor, and dried by benzene distillation. The reaction product had an average molecular weight of 620, determined according to the method of Rast (Ber. 55, 1051, 3727: 1932). The theoretical molecular weight of this bis-oxazoline is 625.

Example 2

Following the method described in Example 1 above 83.0 grams (0.1 mol) of terephthalic acid were reacted with 61 grams (1.0 mol) of monoethanolamine in the presence of 50 mols of benzene. The reaction product was determined to have a molecular weight of 309, as compared to an expected or theoretical weight of 314.

Example 3

Following the procedure defined in Example 1, 101 grams (0.5 mol) of sebacic acid (HOOC(CH$_2$)$_8$COOH) were reacted with 61 grams (1.0 mol) of monoethanolamine in the presence of 50 ml. of benzene. The reaction product amounted to 116 grams.

Example 4

Following the procedure of Example 1, 105 grams (0.5 mol) of mucic acid (HOOC(CHOH)$_4$COOH) were reacted with 61 grams of monoethanolamine (1.0 mol) and 50 ml. of benzene. The reaction product of 128 grams had a molecular weight of 353. This compared with a theoretical yield of 130 grams and an expected molecular weight of 359.

Example 5

In accordance with the procedure set forth in Example 1, 59 grams (0.5 mol) of succinic acid $$(HOOC(CH_2)_2COOH)$$

were added to 61 grams (1.0 mol) of monoethanolamine and 50 ml. of benzene. A reaction product was obtained amounting to 94 grams.

The effectiveness of my compositions in reducing the corrosiveness of oil field brine may be more fully understood by reference to certain tests which I have conducted, using prepared brines to substantially duplicate well conditions. A test procedure involved a measurement of the corrosive action of a hypothetical well fluid as inhibited with compositions described above upon weighed, cleaned, and polished strips of number 18 gauge cold rolled steel measuring one-quarter inch by four inches, under conditions closely approximating those existing in a producing well and a comparison thereof with the results obtained by subjecting identical strips to the corrosive action of my hypothetical well fluid without inhibitor added.

The test includes the use of a number of bottles or flasks sufficient to provide one for the testing of corrosion inhibitors in varying amounts, and one for comparison for each of the corrosion inhibitors being tested. To cleaned and numbered one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about one hour to purge any oxygen present. After the purging was completed, the corrosive inhibitor being tested was added to each flask in amounts ranging from 10 to 50 p.p.m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The change in weight of the test strips during the corrosion test were taken as a measure of the effectiveness of the inhibitor compositions; thus a protection percent may be calculated for each of the test strips taken from the inhibited test fluids in accordance with the following formula:

$$\frac{L_1 - L_2}{L_1} \times 100$$

in which $L_1$ is the loss in weight of strips taken from uninhibited test fluids, and $L_2$ is the loss in weight of strips which were subjected to inhibited test fluids.

The results of tests carried out with bis-oxazoline structures of my invention are summarized in the table below. For each of the acids recorded, it is understood that bis-oxazoline was prepared by reaction of the acid with the monoethanolamine. Under "Percent Protection," three columns are provided for respective test results obtained when utilizing 50, 25, and 10 p.p.m. respectively of the specific bis-oxazoline compounds.

Table I

| Inhibitor No. | Acid Used | Percent Protection | | |
|---|---|---|---|---|
| | | 50 p.p.m. | 25 p.p.m. | 10 p.p.m. |
| 1 | Dimer HO$_2$C(CH$_2$)$_{16}$CO$_2$H | 97.1 | 89.2 | 52.1 |
| 2 | Succinic HO$_2$C(CH$_2$)$_2$CO$_2$H | 93.7 | 74.8 | 66.1 |
| 3 | Sebacic HO$_2$C(CH$_2$)$_8$CO$_2$H | 91.3 | 69.8 | 42.1 |
| 4 | Terephthalic H$_2$OOCC$_6$H$_4$CO$_2$H | 99.1 | 96.8 | 91.4 |
| 5 | Mucic HO$_2$C(CHOH)$_4$CO$_2$H | 90.8 | 70.4 | 33.1 |
| 6 | Oxalic H$_2$OCCO$_2$H | 40.1 | 0 | |

It will be noted from the foregoing that the bis-oxazolines prepared by reacting oxalic with the 2-amino ethanol provided a bis-oxazoline structure which, at 50 p.p.m., provided very poor protection against the corrosion-producing elements in the brine as compared to the longer chain dibasic acids, represented by sebacic, succinic, and dimerized linoleic acid.

It will be evident from the foregoing table that corrosion may be effectively reduced to a value of one-tenth or less of that due to the natural flow of well fluids through the well tubing and pipe lines by incorporating in the well fluid comparatively small quantities of the bis-oxazoline compounds.

In using my improved compositions for protecting the piping, casings, and other equipment which comes in contact with the corrosive fluids, I have found that excellent results may be obtained by injecting an appropriate quantity, generally not more than 100 p.p.m., of a selected corrosion inhibiting compound into a producing well so that it may mingle with the oil brine mixture and come into contact with the producing equipment. If desired, the inhibiting composition may be introduced directly into the top of the casing and be permitted to flow down into the well, and thence back through the tubing and into related apparatus. I have found that if this procedure is followed, substantial reduction in corrosion throughout the entire production and collecting system may be obtained.

The nature of the inhibiting action of my improved composition is not fully understood, but apparently the bis-oxazoline compounds of this invention preferentially wet the surface of the metal equipment with oil, thus excluding the brine from contact with the metal. In any event, however, despite the lack of a complete understanding of the mechanics of inhibiting effect the bis-oxazoline structures of my invention are extremely and surprisingly effective in protecting oil well and oil field equipment from corrosion, even when used in amounts of 50 p.p.m. or less, based on the oil content of the well fluid.

I recognize that oxazolidine compounds have been suggested for use as corrosion inhibitors. In fact, application Serial Number 293,454, filed June 13, 1952, of which I am co-inventor with Richard E. Lembcke, describes and claims oxazolidine structures as corrosion inhibitors. The bis-oxazoline structures which I have found to be unusually effective differ considerably in structure and effect from the oxazolidines. This difference in activity is believed due in part to the double nitrogen carbon bond existing in the oxazoline structure. It is of interest to note that I have not been able to prepare according to the method described herein the bis structure of oxazolidines.

It is well known in the corrosion inhibiting field and unexplainable that certain inhibitors will provide substantial reduction in corrosion in certain wells, whereas substantially similar compounds, some differing only in a double bond, when used in the same well have absolutely no effect in inhibiting corrosion. These phenomena are not clearly understood and the causes of them are not well known. This dissimilarity in effect of the same structure in different wells or structures, differing only in a double bond in the same well in providing a widely different corrosion inhibiting effect is demonstrated in the following example in which the pumps of an operating gasoline plant which are subject to air were treated with a corrosion inhibitor having ring N in both a single and double bond state. A sample of specially purified 2-heptadecylimidazoline (double bond N in ring) was prepared by reaction of ethylene diamine and stearic acid and tested as an inhibitor in corrosive oils both with and without traces of oxygen. All air was removed from the oil according to the usual procedure by passing an inert gas into the crude oil for a period of one hour. In this case, the unsaturated structure showed a definite superiority in inhibiting characteristics in the completely purged system. In the system that had been exposed to air for some days without attention to its characteristics, corrosion was actually promoted by the chemical through serious pitting. The same sample of corrosion inhibitor was then reduced by using sodium metal in isopropyl alcohol solvent at room temperature to form 2-heptadecylimidazolidine. It was found that when the saturated ring was used, no difference between the protection afforded in the presence and in the absence of oxygen was observed. It is obvious that in the presence of oxygen the fully saturated ring is superior to the unsaturated ring.

The effectiveness of the compounds of my present invention of bis-oxazoline structures over previously known and described oxazoline compounds having unsaturated rings will be readily apparent from Table II which follows. In Table II, inhibitors 1 and 3 represent bis-oxazoline structures in which the double oxazoline ring is present. In inhibitors 2 and 4, the single ring oxazoline is present. In both cases it will be noted that the bis-oxazoline structure, inhibitors 1 and 3, provides substantially more effective protection.

The difference in percentage protection with respect to the specific brine tested (same brine in all tests) is apparent by reference to percent protection in which the respective inhibiting compounds were utilized in amounts of 100, 50, and 25 p.p.m.

Table II

| Inhibitor No. | Amine | Acid | Percent Protection | | |
|---|---|---|---|---|---|
| | | | 100 p.p.m. | 50 p.p.m. | 25 p.p.m. |
| 1 | MEA a | Terephthalic | 99.1 | 96.8 | 91.4 |
| 2 | MEA a | Benzoic | 90.0 | 78.3 | 42.3 |
| 3 | MEA a | Succinic | 93.7 | 74.8 | 66.1 |
| 4 | MEA a | Acetic | 86.4 | 43.2 | | a MEA—monoethanolamine.

It is to be understood that the improved compositions of my invention are not limited to use alone and may be applied along with other agents commonly introduced in the producing oil wells for breaking emulsions, preventing scaled formation, minimizing pitting, etc. It is further evident that my invention is not restricted to the use of improved compositions for inhibiting corrosion in oil wells, but may be employed to perform this function in the presence of corrosive fluids derived from other sources.

Having now described my invention, what I claim as new and useful is:

1. A method of protecting ferrous metals which are subjected to corrosive fluids including an acidic component selected from the group consisting of carbon dioxide and hydrogen sulfide which comprises introducing into said fluid in contact with said ferrous metal a corrosion inhibiting amount of a compound having the generic formula

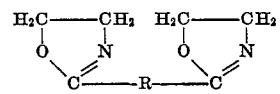

in which R is the acid residue of a dicarboxylic acid selected from the group consisting of succinic, sebacic, terephthalic, and mucic acids.

2. The method according to claim 1, in which the dibasic acid is succinic acid.

3. The method according to claim 1, in which the dibasic acid is sebacic acid.

4. The method according to claim 1, in which the dibasic acid is terephthalic acid.

5. The method according to claim 1, in which the dibasic acid is mucic acid.

References Cited in the file of this patent
UNITED STATES PATENTS

| 2,646,399 | Hughes | July 21, 1953 |
| 2,723,233 | Lytle | Nov. 8, 1955 |
| 2,839,465 | Jones | June 17, 1958 |